(12) United States Patent
Iwata

(10) Patent No.: US 11,321,362 B2
(45) Date of Patent: May 3, 2022

(54) ANALYSIS APPARATUS, ANALYSIS METHOD AND PROGRAM

(71) Applicant: NIPPON TELEGRAPH AND TELEPHONE CORPORATION, Tokyo (JP)

(72) Inventor: Tomoharu Iwata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/265,098

(22) PCT Filed: Jun. 25, 2019

(86) PCT No.: PCT/JP2019/025142
§ 371 (c)(1),
(2) Date: Feb. 1, 2021

(87) PCT Pub. No.: WO2020/026646
PCT Pub. Date: Feb. 6, 2020

(65) Prior Publication Data
US 2021/0303599 A1    Sep. 30, 2021

(30) Foreign Application Priority Data
Aug. 2, 2018   (JP) .............................. JP2018-145624

(51) Int. Cl.
*G06F 16/28*    (2019.01)
*G06F 16/25*    (2019.01)
*G06N 3/08*    (2006.01)

(52) U.S. Cl.
CPC .......... *G06F 16/285* (2019.01); *G06F 16/258* (2019.01); *G06F 16/288* (2019.01); *G06N 3/08* (2013.01)

(58) Field of Classification Search
CPC .... G06F 16/285; G06F 16/258; G06F 16/288; G06N 3/08
(Continued)

(56) References Cited

U.S. PATENT DOCUMENTS

| 7,051,017 B2* | 5/2006 | Marchisio | ............. | G06F 16/334 |
| | | | | 707/713 |
| 7,562,088 B2* | 7/2009 | Daga | ..................... | G06F 16/334 |

(Continued)

OTHER PUBLICATIONS

Yoshikawa et al. (2015) "Cross-Domain Matching for Bag-of-Words Data via Kernel Embeddings of Latent Distributions," Advances in Neural Information Processing Systems, pp. 1405-1413.

(Continued)

*Primary Examiner* — Dung K Chau

(57) ABSTRACT

Included are a vector estimation means that estimates, in response to receiving input of a plurality of pieces of relational data each including a plurality of objects and a relationship between the objects, for each piece of relational data, a latent vector for characterizing a structure of the relational data by using the objects and the relationship included in the relational data; and a matching means that matches, for each set of first relational data and second relational data different from each other of the received pieces of relational data, a first object and a second object by using a first latent vector corresponding to the first object included in the first relational data and a second latent vector corresponding to the second object included in the second relational data. The vector estimation means estimates, when the relationship indicates a close relationship between a plurality of objects to each other, latent vectors corresponding to the objects such that the latent vectors corresponding to the respective objects have a close relationship to each other.

20 Claims, 8 Drawing Sheets

(58) Field of Classification Search
USPC .......................................................... 707/739
See application file for complete search history.

(56) References Cited

U.S. PATENT DOCUMENTS

| | | | |
|---|---|---|---|
| 8,996,350 B1* | 3/2015 | Dub ...................... | G06F 16/353 |
| | | | 704/1 |
| 10,242,019 B1* | 3/2019 | Shan ....................... | G06N 7/005 |
| 2011/0010319 A1* | 1/2011 | Harada ............... | G06F 16/3347 |
| | | | 706/12 |
| 2018/0096417 A1* | 4/2018 | Cook ..................... | G06F 16/953 |
| 2018/0165554 A1* | 6/2018 | Zhang .................. | G06K 9/6256 |

OTHER PUBLICATIONS

Iwata et al. (2013) "Unsupervised Cluster Matching via Probabilistic Latent Variable Models," Proceedings of the Twenty-Seventh AAAI Conference on Artificial Intelligence, 7 pages.

* cited by examiner

ANALYSIS APPARATUS, ANALYSIS METHOD AND PROGRAM

CROSS-REFERENCE TO RELATED APPLICATIONS

This application is a U.S. 371 Application of International Patent Application No. PCT/JP2019/025142, filed on 25 Jun. 2019, which application claims priority to and the benefit of JP Application No. 2018-145624, filed on 2 Aug. 2018, the disclosures of which are hereby incorporated herein by reference in their entireties.

TECHNICAL FIELD

The present invention relates to an analysis device, an analysis method, and a program.

BACKGROUND ART

For a plurality of data sets given, the task of finding a correspondence between objects included in respective different data sets is called object matching. For example, a task of using data sets, each of which is a set of words expressed in a certain language and matching words having the same meaning between data sets of different languages is one application of object matching. Further, for example, a task of using data sets, each of which is a database storing information such as attributes of persons and matching pieces of information on the same person between different databases is one application of object matching.

As a technique of object matching, a technique of supervised object matching has been proposed (e.g., NPL 1). A technique of unsupervised object matching has also been proposed (e.g., NPL 2).

CITATION LIST

Non Patent Literature

[NPL 1] Y. Yoshikawa, T. Iwata, H. Sawada, T. Yamada, "Cross-domain matching for bag-of-words data via kernel embeddings of latent distributions", In Advances in Neural Information Processing Systems, pages 1405-1413, 2015
[NPL 2] T. Iwata, T. Hirao, N. Ueda, "Unsupervised Cluster Matching via Probabilistic Latent Variable Models", AAAI, 2013

SUMMARY OF THE INVENTION

Technical Problem

However, for example, in the technique proposed in NPL 1, it is necessary that distances between objects in different data sets are defined, or that correspondences between some objects in different data sets are known. Therefore, if the distances between objects in different data sets are not defined, and if any correspondence between objects in different data sets is not provided, matching of objects between different data sets is not possible.

On the other hand, for example, in the technique proposed in NPL 2, even if any correspondence between objects in different data sets is not provided, matching of objects between the data sets is possible. However, it is not possible to handle their relational data. Here, the relational data is data in which a relationship between objects included in the relational data is provided. For example, relationships between users in social networks, links of web pages, relations between citing and cited scientific and technical papers, relations between documents and words, and the like are represented as relational data.

The present invention has been made in view of the foregoing, and an object of the present invention is to match objects between different pieces of relational data.

Means for Solving the Problem

In order to achieve the above object, an embodiment of the present invention includes: a vector estimation means that estimates, in response to receiving input of a plurality of pieces of relational data each including a plurality of objects and a relationship between the objects, for each piece of relational data, a latent vector for characterizing a structure of the relational data by using the objects and the relationship included in the relational data; and a matching means that matches, for each set of first relational data and second relational data different from each other of the received pieces of relational data, a first object and a second object by using a first latent vector corresponding to the first object included in the first relational data and a second latent vector corresponding to the second object included in the second relational data, wherein the vector estimation means estimates, when the relationship indicates a close relationship between a plurality of objects to each other, latent vectors corresponding to the objects such that the latent vectors corresponding to the respective objects have a close relationship to each other.

Effects of the Invention

Objects can be matched with each other between different pieces of relational data.

DESCRIPTION OF EMBODIMENTS

Figure 1:
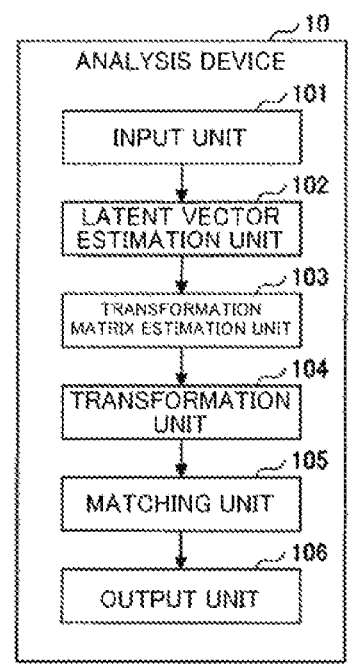
FIG. 1 is a diagram illustrating an example of a functional configuration of an analysis device according to an embodiment of the present invention.

Embodiments of the present invention will be described below in detail with reference to the drawings. In an embodiment of the present invention, an analysis device 10 will be described that can match, for a plurality of pieces of relational data given, objects included in respective different pieces of relational data. Using the analysis device 10 according to the embodiment of the present invention makes it possible to match, for a plurality of pieces of relational data given, objects between different pieces of relational data. In addition, for example, even if distances between objects in different pieces of relational data are not defined, or even if any correspondence between objects in different pieces of relational data is not provided, it is possible to match the objects.

For a plurality of pieces of relational data given, the analysis device 10 according to the embodiment of the present invention transforms, for each piece of relational data, each object included in the relational data into a latent vector, and then matches objects between different pieces of relational data based on distances between latent vectors. At this time, the analysis device 10 according to the embodiment of the present invention transforms the objects included in the relational data into latent vectors so as to satisfy the following Condition 1 and Condition 2.

Condition 1: Transform any two objects included in the relational data so that spatial positions of resulting latent vectors are closer to each other in a case where these two objects have a relationship (or a close relationship) than in a case where they have no relationship (or a distant relationship).

Condition 2: Transform so that the distributions of the latent vectors of the respective pieces of relational data are as similar to each other as possible.

Note that the latent vector is a vector for characterizing the structure of the relational data.

Hereinafter, assume that D (2) pieces of relational data:

[Formula 1]

$$\{G_d\}_{d=1}^{D}$$

are given to the analysis device 10. Here, $G_d = (V_d, E_d)$ is the d-th relational data,

[Formula 2]

$$V_d = \{v_{d1}, \ldots, v_{dN_d}\}$$

represents an object set of the d-th relational data, $N_d$ represents the number of objects included in the d-th relational data, and $E_d$ represents a relation set of the d-th relational data.

Note that the relation set is a set that represents a relationship between objects included in the relational data. The relation set can be represented by, for example, a matrix of $N_d \times N_d$, $X = (x_{mn})$ in which $x_{mn} = 1$ for a relationship between the m-th object and the n-th object, and $x_{mn} = 0$ for no relationship between the m-th object and the n-th object.

However, the relation set is not limited to for a relationship or no relationship between objects included in the relational data, and may be, for example, for a relationship with weight. The relationship with weight is, for example, such that the element $x_{mn}$ of the matrix X can have any value not 0 or 1.

Further, the objects included in the relational data may be one type of object, or may be a plurality of mixed types of objects. Furthermore, the relational data may be relational data into which any data that is not originally relational data is translated based on a similarity or the like of the objects included in the data.

In this way, the analysis device 10 according to the embodiment of the present invention can be given any D pieces of relational data.

<Functional Configuration of Analysis Device 10>

First, a functional configuration of the analysis device 10 according to the embodiment of the present invention will be described with reference to FIG. 1. FIG. 1 is a diagram illustrating an example of the functional configuration of the analysis device 10 according to the embodiment of the present invention.

As illustrated in FIG. 1, the analysis device 10 according to the embodiment of the present invention includes an input unit 101, a latent vector estimation unit 102, a transformation matrix estimation unit 103, a transformation unit 104, a matching unit 105, and an output unit 106.

The input unit 101 receives input of D pieces of relational data $G_1, \ldots, G_D$. The input unit 101 may receive the input by reading the relational data stored in an auxiliary storage device or the like, or may receive the input by acquiring (downloading) the relational data from a server device or the like connected thereto via a communication network.

The latent vector estimation unit 102 estimates, for each relational data $G_d$ received by the input unit 101, a latent vector of each object $v_{dn}$ (n=1, . . . , $N_d$) included in the relational data $G_d$. Note that a detailed functional configuration of the latent vector estimation unit 102 will be described below.

In the embodiment of the present invention, two types of latent vectors $u_{dn} \in R^K$ and $h_{dn} \in R^K$ are estimated for each object $v_{dn}$ by way of example. Here, R is a field of real numbers, and K is the number of dimensions of the latent vector space.

Accordingly, as a characteristic of the structure of the relational data characterized by these two latent vectors, for example, a close relationship between the two types of latent vectors can be used. A probability $p(v_{dr}|v_{dn})$ that an object van, is close to another object $v_{dn}$ can be modeled by inner product of the latent vectors, for example, as illustrated in the following Equation (1).

[Formula 3]

$$p(v_{dm} \mid v_{dn}) = \frac{\exp(u_{dm}^T h_{dn})}{\sum_{m'=1}^{N_d} \exp(u_{dm'}^T h_{dn})}, \quad (1)$$

where T represents a transposition of the vector.

Note that, in the embodiment of the present invention, the two types of latent vectors $u_{dn}$ and $h_{dn}$ are used as an example, but the present invention is not limited to this, and only one type of latent vector may be used. In this case, the characteristic of the structure of the relational data may be modeled by a close relationship between latent vectors of one type.

At this time, the latent vector estimation unit 102 estimates the latent vectors so that the close relationship between the latent vectors is as similar to the close relationship between the objects included in the relational data received by the input unit 101 as possible. For example, the latent vector estimation unit 102 represents all latent vectors included in the d-th relational data $G_d$ as:

[Formula 4]

$$U_d = \{u_{dn}\}_{n=1}^{N_d}, H_d = \{h_{dn}\}_{n=1}^{N_d},$$

and estimates the latent vectors so as to minimize an objective function (close negative log-likelihood) represented by the following Equation (2):

[Formula 5]

$$L_d(U_d, H_d) = \sum_{n=1}^{N_d} \sum_{v_{dm} \in N(v_{dn})} \log p(v_{dm} | v_{dn}), \quad (2)$$

where $N(v_{dn}) \subseteq V_d$ represents a close set of the object van. The close relationship between the objects included in the relational data $G_d$ is given by a relation set $E_d$ included in the relational data $G_d$. For example, in a series obtained by a random walk on the relation set $E_d$, an object that appears within a certain range may be defined as an object having a close relationship. More specifically, for example, when the relation set $E_d$ is represented by the above matrix of $N_d \times N_d$, $X=(x_{mn})$, m for which $x_{nm}=1$ for n is randomly extracted. Next, m' for which $x_{mm'}=1$ is randomly extracted. Furthermore, m" for which $x_{m'm"}=1$ is randomly extracted. Similarly, an operation of randomly extracting a point (object index) having a relationship with the last extracted point (object index) is repeated a predetermined number of times, so that a series of m, m', m", ... obtained by a random walk on the relation set $E_d$ for n is obtained. Performing this operation for each n obtains a predetermined number of series, and a set of objects $v_{dm}$ included therein can be set as $N(v_{dn})$. Then, the latent vectors can be estimated so that the value of inner product of the latent vectors of such objects having a close relationship (the above Equation (1)) becomes large.

Note that a method of defining the objects having a close relationship is not limited to the above method. For example, objects related to each other may be defined as objects having a close relationship.

The transformation matrix estimation unit 103 estimates a transformation matrix for embedding the latent vectors $u_{dn}$ and $h_{dn}$ estimated by the latent vector estimation unit 102 in a common space. Note that a detailed functional configuration of the transformation matrix estimation unit 103 will be described below.

The transformation matrix estimation unit 103 estimates the transformation matrix such that the distributions of the latent vectors of the respective pieces of relational data are as similar to each other as possible while preserving the characteristics of the structure of the relational data represented by the latent vectors. Here, when a transformation matrix for the d-th relational data $G_d$ is $W_d \in \mathbb{R}^{K \times K}$, the latent vectors $u_{dn}$ and $h_{dn}$ are transformed by the transformation matrix $W_d$, so that the following respective latent vectors are obtained:

[Formula 6]

$$\tilde{u}_{dn} = W_d u_{dn}, \tilde{h}_{dn} = W_d h_{dn}$$

Hereinafter, the latent vector obtained by transforming the latent vector $u_{dn}$ with the transformation matrix $W_d$ is also referred to as "$\sim u_{dn}$", and the latent vector obtained by transforming the latent vector $h_{dn}$ with the transformation matrix $W_d$ is also referred to as "$\sim h_{dn}$".

Here, for example, since the model represented by the above Equation (1) is expressed only by inner product, making the transformation matrix as close to an orthogonal matrix as possible makes it possible to obtain a transformation matrix such that the latent vectors are embedded in a common space while the characteristics of the structure of the relational data are preserved.

Further, as a method of making the distributions of the latent vectors of the respective pieces of relational data as similar to each other as possible, for example, there is a method of reducing an MMD (maximum mean discrepancy) which is a distance between the distributions.

Therefore, the transformation matrix estimation unit 103 estimates the transformation matrix $W_d$ so as to minimize the objective function represented by, for example, the following Equation (3):

[Formula 7]

$$E(W) = \sum_{d=2}^{D} \|W_d^T W_d - I\|^2 + \lambda \sum_{d=1}^{D} \sum_{d'=d+1}^{D} (MMD^2(\overline{U}_d, \overline{U}_{d'}) + MMD^2(\tilde{H}_d, \tilde{H}_{d'})), \quad (3)$$

where $MMD^2$ represents the power of MMD, and $\lambda$ is a hyperparameter. Further,

[Formula 8]

$$\tilde{U}_d = \{\tilde{u}_{dn}\}_{n=1}^{N_d}, \tilde{H}_d = \{\tilde{h}_{dn}\}_{n=1}^{N_d}$$

The first term of the above Equation (3) has the effect of making $W_d$ as close to an orthogonal matrix as possible, and the second term has the effect of making the distributions of the latent vectors as similar to each other as possible.

Note that, as a method of making the distributions of the latent vectors as similar to each other as possible, any method instead of the method of using MMD may be used, for example, such as a method of using adversarial learning, a method of equalizing mean and variance, or a method of minimizing the Kullback-Leibler divergence under assumption of normal distributions. Further, for example, when correspondences are obtained between some pieces of relational data of the pieces of relational data received by the input unit 101, the transformation matrix estimation unit 103 may estimate a transformation matrix such that these correspondences are preserved.

The transformation unit 104 transforms, for each relational data $G_d$, each of the latent vectors $u_{dn}$ and $h_{dn}$ (n= 1, ..., $N_d$) with the transformation matrix $W_d$. As a result, the latent vectors $u_{dn}$ and $h_{dn}$ (n=1, ... $N_d$) are transformed into the transformed latent vectors $\sim u_{dn}$ and $\sim h_{dn}$ (n=1, ... $N_d$).

The matching unit 105 uses the transformed latent vectors $\sim u_{dn}$ and $\sim h_{dn}$ (n=1, ... $N_d$, d=1, D) for each set of pieces of relational data to match the objects between the pieces of relational data. Note that a detailed functional configuration of the matching unit 105 will be described below.

The matching unit 105 calculates, for example, a distance between the transformed latent vectors, and matches the objects corresponding to the latent vectors having a short distance (more specifically, the latent vectors having a distance equal to or less than a predetermined threshold). Further, when it is desired to match the objects on a one-to-one basis, the matching unit 105 may use, for example, the Hungarian method or the like to find correspondences in which the sum of the distances between the corresponding objects is minimized.

The output unit 106 outputs information indicating the correspondences between the objects of the relational data obtained by the matching unit 105. This information includes, for example, the sets of pieces of relational data and correspondences between objects included in each piece of relational data. Note that the output destination of the output unit 106 can be any output destination. Examples of such an output include an auxiliary storage device, a display device such as a display, and other devices connected via a communication network.

<Detailed Functional Configuration of Latent Vector Estimation Unit 102>

Figure 2:
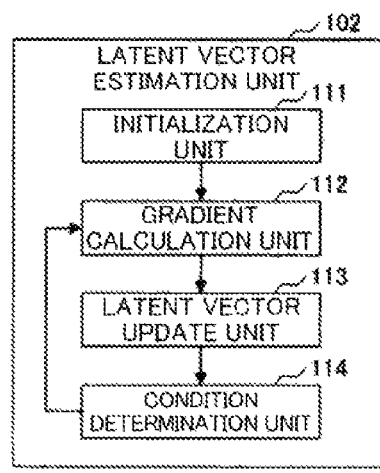
FIG. 2 is a diagram illustrating an example of a detailed functional configuration of a latent vector estimation unit according to the embodiment of the present invention.

Next, a detailed functional configuration of the latent vector estimation unit 102 according to the embodiment of the present invention will be described with reference to FIG. 2. FIG. 2 is a diagram illustrating an example of the detailed functional configuration of the latent vector estimation unit 102 according to the embodiment of the present invention.

As illustrated in FIG. 2, the latent vector estimation unit 102 according to the embodiment of the present invention includes an initialization unit 111, a gradient calculation unit 112, a latent vector update unit 113, and a condition determination unit 114.

The initialization unit 111 initializes the latent vectors. The gradient calculation unit 112 calculates gradients with respect to the latent vectors of the objective function.

Here, the objective function is, for example, the log-likelihood represented by the above Equation (2). Further, the gradients with respect to the latent vectors of the objective function are a partial derivative with respect to the latent vector $u_{dn}$ of the objective function represented by the above Equation (2) and a partial derivative with respect to the latent vector $h_{dn}$ of the objective function.

The latent vector update unit 113 uses the gradients calculated by the gradient calculation unit 112 to update the latent vectors so that the value of the objective function represented by the above Equation (2) becomes small. Here, in order to reduce the value of the objective function, any optimization method may be used, for example, such as the steepest descent method, the stochastic gradient method, or the Newton method.

When the latent vector update unit 113 updates the latent vectors, the condition determination unit 114 determines whether or not a predetermined end condition is satisfied. Then, the latent vector estimation unit 102 repeatedly executes the calculation of the gradients by the gradient calculation unit 112 and the updating of the latent vectors by the latent vector update unit 113 until the condition determination unit 114 determines that the predetermined end condition is satisfied. On the other hand, when the condition determination unit 114 determines that the predetermined end condition is satisfied, the latent vector estimation unit 102 uses the current latent vectors as the results of estimating the latent vectors.

Here, as the predetermined end condition, any condition may be used, for example, such as a predetermined number of times of repetition being reached, the amount of changes in the latent vectors before and after the updating by the latent vector update unit 113 being equal to or less than a predetermined threshold, the absolute value of the value of the objective function being less than or equal to a predetermined threshold, or the amount of change in the value of the objective function being less than or equal to a predetermined threshold.

<Detailed Functional Configuration of Transformation Matrix Estimation Unit 103>

Figure 3:
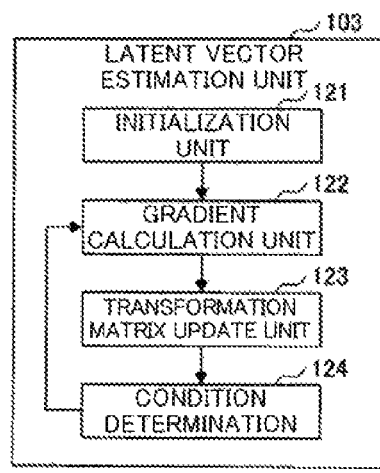
FIG. 3 is a diagram illustrating an example of a detailed functional configuration of a transformation matrix estimation unit according to the embodiment of the present invention.

Next, a detailed functional configuration of the transformation matrix estimation unit 103 according to the embodiment of the present invention will be described with reference to FIG. 3. FIG. 3 is a diagram illustrating an example of the detailed functional configuration of the transformation matrix estimation unit 103 according to the embodiment of the present invention.

As illustrated in FIG. 3, the transformation matrix estimation unit 103 according to the embodiment of the present invention includes an initialization unit 121, a gradient calculation unit 122, a transformation matrix update unit 123, and a condition determination unit 124.

The initialization unit 121 initializes the transformation matrix. The gradient calculation unit 122 calculates a gradient with respect to the transformation matrix of the objective function.

Here, the objective function is, for example, the above Equation (3). Further, the gradient with respect to the transformation matrix of the objective function is a partial derivative with respect to the transformation matrix $W_d$ of the objective function represented by the above Equation (3).

The transformation matrix update unit 123 uses the gradient calculated by the gradient calculation unit 122 to update the transformation matrix so that the value of the objective function represented by the above Equation (3) becomes small. Here, in order to reduce the value of the objective function, any optimization method may be used, for example, such as the steepest descent method, the stochastic gradient method, or the Newton method.

When the transformation matrix update unit 123 updates the transformation matrix, the condition determination unit 124 determines whether or not a predetermined end condition is satisfied. Then, the transformation matrix estimation unit 103 repeatedly executes the calculation of the gradient by the gradient calculation unit 122 and the updating of the transformation matrix by the transformation matrix update unit 123 until the condition determination unit 124 determines that the predetermined end condition is satisfied. On the other hand, when the condition determination unit 124 determines that the predetermined end condition is satisfied, the transformation matrix estimation unit 103 uses the current transformation matrix as the result of estimating the transformation matrix.

Here, as the predetermined end condition, any condition may be used, for example, such as a predetermined number of times of repetition being reached, the amount of change in the transformation matrix before and after the updating by the transformation matrix update unit 123 being equal to or less than a predetermined threshold, the absolute value of the value of the objective function being less than or equal to a predetermined threshold, or the amount of change in the value of the objective function being less than or equal to a predetermined threshold.

<Detailed Functional Configuration of Matching Unit 105>

Figure 4:
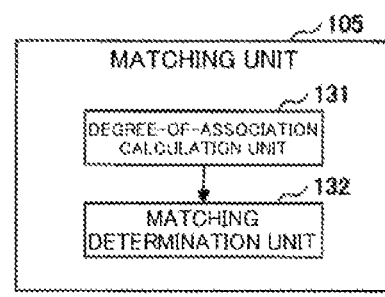
FIG. 4 is a diagram illustrating an example of a detailed functional configuration of a matching unit according to the embodiment of the present invention.

Next, a detailed functional configuration of the matching unit 105 according to the embodiment of the present invention will be described with reference to FIG. 4. FIG. 4 is a diagram illustrating an example of the detailed functional configuration of the matching unit 105 according to the embodiment of the present invention.

As illustrated in FIG. 4, the matching unit 105 according to the embodiment of the present invention includes a degree-of-association calculation unit 131 and a matching determination unit 132.

The degree-of-association calculation unit 131 uses the transformed latent vectors for each set of pieces of relational data to calculate degrees of association between objects included in the respective pieces of the relational data. The degree of association represents a strength (closeness) of the association between the objects, and is represented by a distance between the latent vectors corresponding to the respective objects, for example. Note that, as the distance, for example, any distance can be used such as a Euclidean distance or a distance based on a cosine.

Here, in the embodiment of the present invention, for each object, there are two types of transformed latent vectors $\sim u_{dn}$ and $\sim h_{dn}$. Accordingly, in calculating the degree of association between objects, only one type of transformed latent vector of the two types of transformed latent vectors $\sim u_{dn}$ and $\sim h_{dn}$ may be used, or both types of transformed latent vectors may be used.

Specifically, for example, when the transformed latent vectors of a first object $v_{dm}$ are set as $\sim u_{dm}$ and $\sim h_{dm}$ and the transformed latent vectors of a second object $v_{dn}$ are set as $\sim u_{dn}$ and $\sim h_{dn}$, any of (A) to (B) can be used as a degree of association between the first object $v_{dm}$ and the second object $v_{dn}$.

(A) Distance between $\sim u_{dm}$ and $\sim u_{dn}$
(B) Distance between $\sim h_{dm}$ and $\sim h_{dn}$
(C) Sum of (A) and (B)

Note that a scale calculated by a method other than the above (A) to (C) may be used as long as the scale is calculated such that the closer the positional relation between the transformed latent vectors of the first object $v_{dm}$, and the transformed latent vectors of the second object $v_{dn}$ in the space, the higher the degree of association between the first object $v_{dm}$ and the second object $v_{dn}$.

The matching determination unit 132 matches, based on the degree of association calculated by the degree-of-association calculation unit 131, an object $v_{dn}$ included in a first relational data $G_d$ and an object $v_{d'm}$ included in a second relational data $G_{d'}$. In other words, objects having a high degree of association are matched with each other between the first relational data $G_d$ and the second relational data $G_{d'}$.

Here, the matching determination unit 132 can match, for example, for each object $v_{dn}$ included in the first relational data $G_d$, the object $v_{dn}$ and an object $v_{d'm}$ having a degree of association with the object $v_{dn}$ with a predetermined criterion, among the objects $v_{d'm}$ included in the second relational data $G_{d'}$. At this time, for example, the matching determination unit 132 may match the object $v_{dn}$ and an object $v_{d'm}$ having the highest degree of association (i.e., the shortest distance between the transformed latent vectors) among the objects $v_{d'm}$ whose degree of association with the object $v_{dn}$ satisfies the predetermined criterion, or may match the object $v_{dn}$ and objects $v_{d'm}$ whose degree of association with the object van satisfies the predetermined criterion in a descending order of degree of association (i.e., in an ascending order of distance between the transformed latent vectors) like a ranking. Note that examples of the predetermined criterion include the degree of association being equal to or higher than a predetermined threshold.

<Processing Flow Performed by Analysis Device 10>

Figure 5:
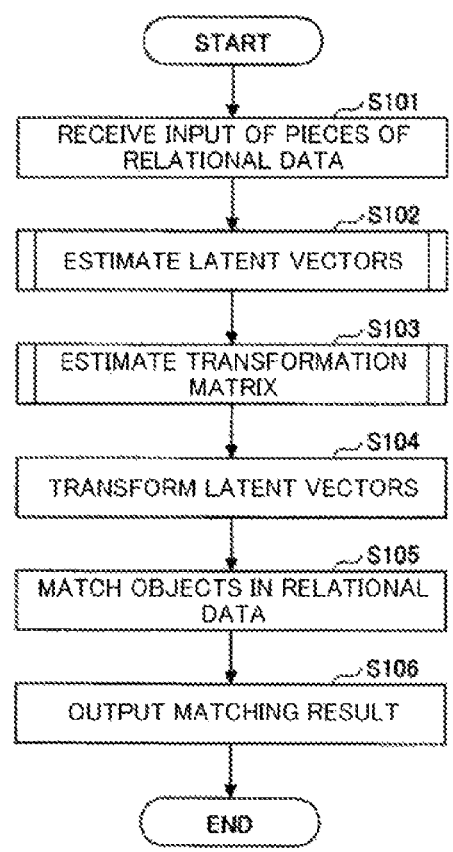
FIG. 5 is a flowchart illustrating an example of a flow of processing performed by the analysis device according to the embodiment of the present invention.

Next, a flow of processing performed by the analysis device 10 according to the embodiment of the present invention will be described with reference to FIG. 5. FIG. 5 is a flowchart illustrating an example of the flow of processing performed by the analysis device 10 according to the embodiment of the present invention.

Step S101: First, the input unit 101 receives input of D pieces of relational data $G_1, \ldots, G_D$.

Step S102: Next, the latent vector estimation unit 102 estimates, for each relational data $G_d$ received by the input unit 101, latent vectors $u_{dn}$ and $h_{dn}$ of each object $v_{dn}$ (n=1, \ldots, $N_d$) included in the relational data $G_d$.

Figure 6:
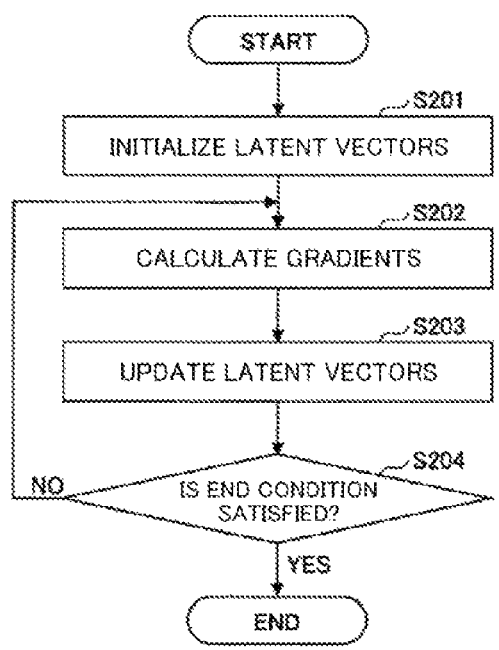
FIG. 6 is a flowchart illustrating an example of a flow of latent vector estimation processing according to the embodiment of the present invention.

Here, a case of estimating the latent vectors $u_{dn}$ and $h_{dn}$ of each object van included in one certain relational data $G_d$ will be described with reference to FIG. 6. FIG. 6 is a flowchart illustrating an example of a flow of latent vector estimation processing according to the embodiment of the present invention.

Step S201: The initialization unit 111 initializes the latent vectors $u_{dn}$ and $h_{dn}$ (n=1, \ldots, $N_d$). Note that the initialization unit 111 may initialize the latent vectors $u_{dn}$ and $h_{dn}$ (n=1, \ldots, $N_d$) to vectors having any values as elements.

Step S202: Next, the gradient calculation unit 112 calculates gradients with respect to the latent vectors $u_{dn}$ and $h_{dn}$ (n=1, \ldots, $N_d$) of the objective function represented by the above Equation (2).

Step S203: Next, the latent vector update unit 113 uses the gradients calculated by the gradient calculation unit 112 to update the latent vectors $u_{dn}$ and $h_{dn}$ (n=1, \ldots, $N_d$) so that the value of the objective function represented by the above Equation (2) becomes small.

Step S204: Next, the condition determination unit 114 determines whether or not a predetermined end condition is satisfied.

Then, when the condition determination unit 114 does not determine that the predetermined end condition is satisfied, the latent vector estimation unit 102 returns the processing to step S202. On the other hand, when the condition determination unit 114 determines that the predetermined end condition is satisfied, the latent vector estimation unit 102 ends the latent vector estimation processing. As a result, the latent vectors $u_{dn}$ and $h_{dn}$ (n=1, \ldots, $N_d$) of each object van included in the relational data $G_d$ are estimated.

Return to FIG. 5. Step S103: Next, the transformation matrix estimation unit 103 estimates a transformation matrix $W_d$ (d=1, D) for each piece of relational data $G_d$.

Figure 7:
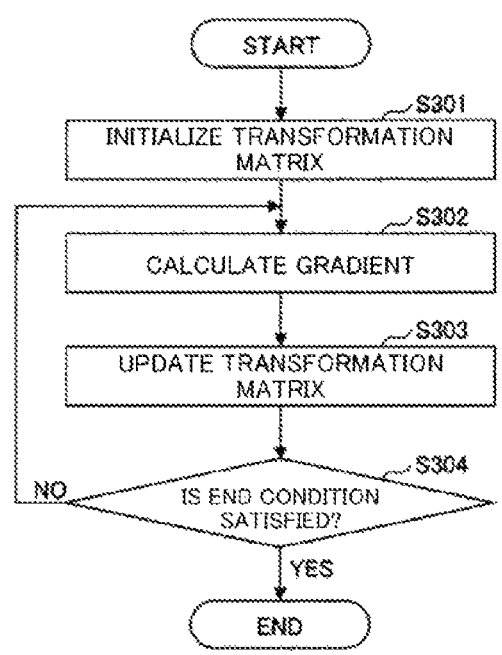
FIG. 7 is a flowchart illustrating an example of a flow of transformation matrix estimation processing according to the embodiment of the present invention.

Here, a case of estimating the transformation matrix $W_d$ corresponding to one certain relational data $G_d$ will be described with reference to FIG. 7. FIG. 7 is a flowchart illustrating an example of a flow of transformation matrix estimation processing according to the embodiment of the present invention.

Step S301: The initialization unit 121 initializes the transformation matrix $W_d$. The initialization unit 121 may initialize the transformation matrix $W_d$ into a matrix having any values as elements.

Step S302: Next, the gradient calculation unit 122 calculates a gradient with respect to the transformation matrix $W_d$ of the objective function represented by the above Equation (3).

Step S303: Next, the transformation matrix update unit 123 uses the gradient calculated by the gradient calculation unit 122 to update the transformation matrix $W_d$ so that the value of the objective function represented by the above Equation (3) becomes small.

Step S304: The condition determination unit 124 determines whether or not a predetermined end condition is satisfied.

Then, when the condition determination unit 124 does not determine that the predetermined end condition is satisfied, the transformation matrix estimation unit 103 returns the processing to step S302. On the other hand, when the condition determination unit 124 determines that the predetermined condition is satisfied, the transformation matrix estimation unit 103 ends the transformation matrix estimation processing. As a result, the transformation matrix $W_d$ corresponding to the relational data $G_d$ is estimated.

Return to FIG. 5. Step S104: The transformation unit 104 transforms, for each relational data $G_d$, each of the latent vectors $u_{dn}$ and $h_{dn}$ (n=1, ..., $N_d$) with the transformation matrix $W_d$. As a result, the latent vectors $u_{dn}$ and $h_{dn}$ (n=1, ... $N_d$) are transformed into the transformed latent vectors $\sim u_{dn}$ and $\sim h_{dn}$ (n=1, ... $N_d$).

Step S105: Next, the matching unit 105 uses the transformed latent vectors $\sim u_{dn}$ and $\sim h_{dn}$ (n=1, ... $N_d$, d=1, ..., D) for each set of pieces of relational data ($G_d$, $G_{d'}$) to match the objects between the pieces of relational data $G_d$ and $G_{d'}$.

In other words, the matching unit 105 causes the degree-of-association calculation unit 131 to use the transformed latent vectors $\sim u_{dn}$ and $\sim h_{dn}$ (n=1, ..., $N_d$) of the first relational data $G_d$ and the transformed latent vectors $\sim u_{d'm}$ and $\sim h_{d'm}$ (m=1, ..., $N_{d'}$) of the second relational data $G_{d'}$ to calculate the degrees of association between objects van (n=1, ..., $N_d$) in the first relational data $G_d$, and objects $v_{d'm}$ (m=1, ..., $N_{d'}$) included in the second relational data $G_{d'}$. As a result, for example, when the degree of association between an object $v_{dn}$ and an object $v_{d'm}$ is referred to as $L_{mn}$, $N_d \times N_{d'}$ degrees of association $L_{mn}$ are calculated.

Next, the matching unit 105 causes the matching determination unit 132 to match, based on the degrees of association $L_{mn}$, the objects van included in the first relational data $G_d$, and the objects $v_{d'm}$ included in the second relational data $G_{d'}$. As a result, the objects are matched with each other between the pieces of relational data $G_d$ and $G_{d'}$.

Step S106: The output unit 106 outputs information indicating the correspondences between the objects obtained by the matching unit 105. As a result, for example, for each set of pieces of relational data ($G_d$, $G_{d'}$), information indicating the correspondences between the objects of the pieces of relational data $G_d$ and $G_{d'}$ is output.

<Examples of Comparison with Conventional Techniques>

Figure 8:
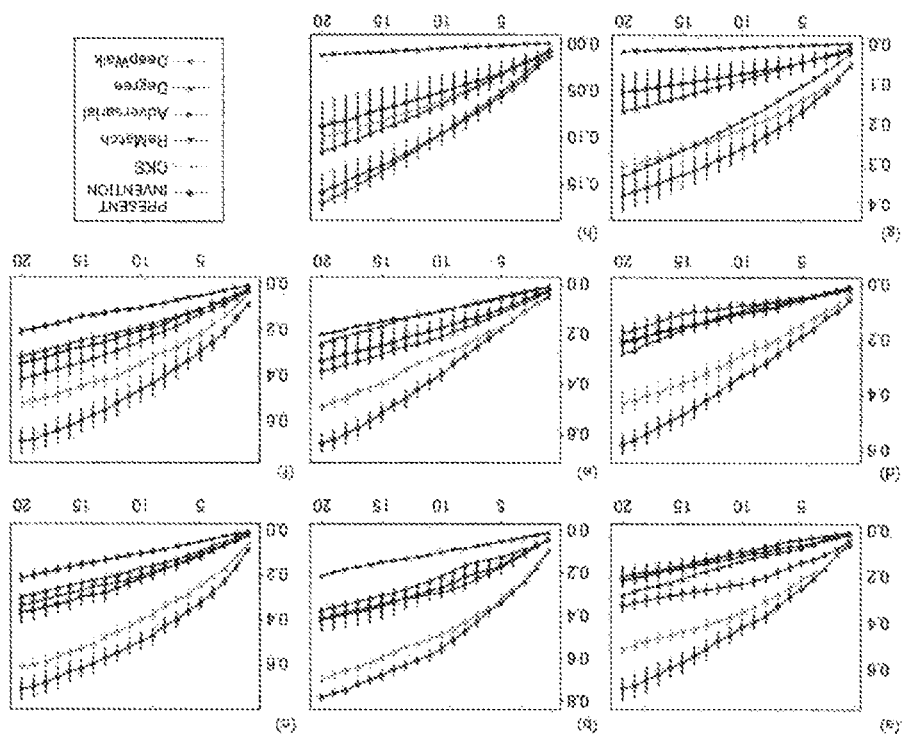
FIG. 8 illustrates examples of comparison with conventional techniques.

Next, examples will be described with reference to FIG. 8 that indicate comparisons between matching of objects of a plurality of pieces of relational data by the analysis device 10 according to the embodiment of the present invention and matching of objects of a plurality of pieces of relational data by conventional techniques. FIG. 8 illustrates the examples of comparison with conventional techniques. In FIG. 8, the conventional techniques used herein are CKS (Convex Kernelized Sorting), ReMatch, Adversarial, Degree, and DeepWalk.

Here, Degree is a technique of matching objects having orders close to each other (the number of relations (links)) between different pieces of relational data. For CKS, ReMatch, Adversarial, and DeepWalk, refer to the following References 1 to 4, respectively.

[Reference Document 1]
N. Djuric, M. Grbovic, and S. Vucetic, "Convex Kernelized Sorting", In Proceedings of the 26th AAAI Conferenceon Articial Intelligence, pp. 893-899, 2012.

[Reference Document 2]
T. Iwata, J. R. Lloyd, and Z. Ghahramani, "Unsupervised many-to-many object matching for relational data", IEEE Transactions on Pattern Analysis and Machine Intelligence, vol. 38, no. 3, pp. 607-617, 2016.

[Reference Document 3]
G. Lample, A. Conneau, L. Denoyer, and M. Ranzato, "Unsupervised machine translation using monolingual corpora only", In International Conference on Learning Representations (ICLR).

[Reference Document 4]
B. Perozzi, R. Al-Rfou, and S. Skiena, "Deepwalk: Online learning of social representations", In Proceedings of the 20th ACM SIGKDD international conference on Knowledge discovery and datamining, pages 701-710, ACM, 2014.

Further, a top R correct answer rate was used as an evaluation index for comparing the embodiment of the present invention with the conventional techniques. In a case where matched objects between different pieces of relational data are ranked according to a predetermined criterion, the top R correct answer rate represents a proportion of correct answers in the top R objects.

FIGS. 8(*a*) to 8(*f*) show examples of comparison with the conventional techniques in a case of using document-word relational data as relational data, and FIGS. 8(*g*) to 8(*h*) show examples of comparison with the conventional techniques in a case of using movie score data as relational data. Here, the vertical axis represents top correct answer rates, and the horizontal axis represents R. Also, error bars each represent a standard error.

In the document-word relational data, each of a plurality of documents and each of a plurality of words were objects, and for a certain word being included in a certain document, it was determined that the word and the document had a relationship. One document-word relational data represents a relationship between a document and a word in a certain language (any language of English, German, Italian, and Japanese).

In FIGS. 8(*a*) to 8(*f*), documents in different languages written for the same content in Wikipedia were set as objects to be matched.

FIG. 8(*a*) shows results when documents (objects) are matched with each other between English document word relational data and German document relational data. FIG. 8(*b*) shows results when documents (objects) are matched with each other between English document word relational data and Italian document relational data. FIG. 8(*c*) shows results when documents (objects) are matched with each other between English document word relational data and Japanese document relational data. FIG. 8(*d*) shows results when documents (objects) are matched with each other between the German document word relational data and the Italian document relational data. FIG. 8(*e*) shows results when documents (objects) are matched with each other between the German document word relational data and the Japanese document relational data. FIG. 8(*f*) shows results when documents (objects) are matched with each other between the Italian document word relational data and the Japanese document relational data.

As illustrated in FIGS. 8(*a*) to 8(*f*), it can be seen that the technique according to the embodiment of the present invention has a higher correct answer rate than the conventional techniques.

Further, in the movie score data, each of a plurality of users and each of a plurality of movies were objects, and for a certain user giving a score to a certain movie, it was determined that they had a relationship. A movie set representing all the objects of the movies was randomly divided into two to create a first movie set and a second movie set, and then a user set representing all the objects of the users, the first movie set, and the second movie set were used to create two pieces of relational data. Accordingly, first relational data including the user set and the first movie set and second relational data including the user set and the second movie set were created.

Then, the same user was set as the object to be matched between the first relational data and the second relational data. The results of this matching are illustrated in FIG. 8(g).

Similarly, the user set was randomly divided into two to create a first user set and a second user set, and then the movie set, the first user set, and the second user set were used to create two pieces of relational data. Accordingly, third relational data including the movie set and the first user set and fourth relational data including the movie set and the second user set were created.

Then, the same movie was set as the object to be matched between the third relational data and the fourth relational data. The results of this matching are illustrated in FIG. 8(h).

As illustrated in FIGS. 8(g) to 8(h) of, it can be seen that the technique according to the embodiment of the present invention has a higher correct answer rate than the conventional techniques.

As described above, the analysis device 10 according to the embodiment of the present invention makes it possible to match more appropriate objects between different pieces of relational data than those in the conventional techniques.

<Modified Example 1>

Next, as Modified Example 1, a case will be described in which the latent vector estimation unit 102 estimates a latent vector(s) satisfying the above Condition 1 and Condition 2 without estimating the transformation matrix $W_d$.

Figure 9:
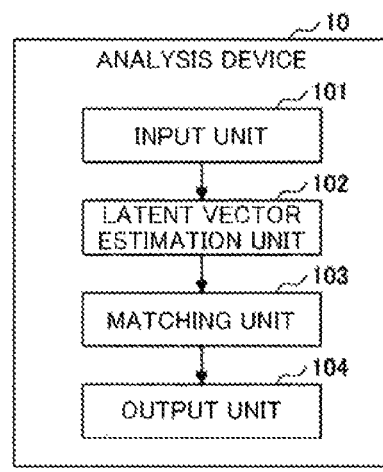
FIG. 9 is a diagram illustrating an example of a functional configuration of an analysis device according to Modified Example 1.

FIG. 9 illustrates a functional configuration of a analysis device 10 according to Modified Example 1. FIG. 9 is a diagram illustrating an example of the functional configuration of the analysis device 10 according to Modified Example 1.

As illustrated in FIG. 9, the analysis device 10 according to Modified Example 1 does not include the transformation matrix estimation unit 103. Further, the latent vector estimation unit 102 according to Modified Example 1 estimates the latent vectors $\sim u_{dn}$ and $\sim h_{dn}$ so as to minimize the objective function represented by the following Equation (4) instead of the above Equation (2).

[Formula 9]

$$E(W) = \sum_{n=1}^{Nd} \sum_{v_{dm} \in N(v_{dn})} \log p(v_{dm} | v_{dn}) + \lambda \sum_{d=1}^{D} \sum_{d'=d+1}^{D} \left( MMD^2(\tilde{U}_d, \tilde{U}_{d'}) + MMD^2(\tilde{H}_d, \tilde{H}_{d'}) \right) \quad (4)$$

The above Equation (4) corresponds to the above Equation (3) in which the first term is replaced with the above Equation (2). As a result, the latent vector estimation unit 102 in Modified Example 1 can estimate the latent vectors $\sim u_{dn}$ and $\sim h_{dn}$ that satisfy the above Condition 1 and Condition 2. In other words, the latent vector estimation unit 102 according to Modified Example 1 can estimate the latent vectors $\sim u_{dn}$ and $\sim h_{dn}$ serving as vectors corresponding to the transformed latent vectors $\sim u_{dn}$ and $\sim h_{dn}$ in the embodiment described above.

In this way, the analysis device 10 according to Modified Example 1 uses the objective function represented by the above Equation (4) as the objective function for estimating the latent vectors, and thus makes it possible to estimate the latent vectors satisfying the above Condition 1 and Condition 2 without estimating the transformation matrix.

<Modified Example 2>

Next, as Modified Example 2, a case will be described in which the latent vectors $u_{dn}$ and $h_{dn}$ are estimated by a neural network. In this case, the latent vector estimation unit 102 according to the above-described embodiment is implemented by a learned neural network.

In the case where the latent vector estimation unit 102 according to the above-described embodiment is implemented by the learned neural network, the latent vectors $u_{dn}$ and $h_{dn}$ can be obtained as outputs in response to inputting relational data to the learned neural network.

In order to obtain such a learned neural network, a set of relational data $G_d$ and latent vectors $u_{dn}$ and $h_{dn}$ corresponding to the relational data $G_d$ is prepared in advance as learning data, and then parameters of the neural network can be learned using this learning data by a known supervised learning method. In other words, the parameters of the neural network are learned so that values of a predetermined loss function are optimized (e.g., minimized). As a result, the "learned neural network" in which the parameters of the neural network have been updated can be obtained.

Similarly, the latent vector estimation unit 102 according to Modified Example 1 may also be implemented by a learned neural network. In this case, the latent vectors $\sim u_{dn}$ and $\sim h_{dn}$ can be obtained as outputs in response to inputting relational data to the learned neural network.

In order to obtain such a learned neural network, a set of relational data $G_d$ and latent vectors $\sim u_{dn}$ and $\sim h_{dn}$ corresponding to the relational data $G_d$ is prepared in advance as learning data, and then parameters of the neural network can be learned using this learning data by a known supervised learning method. Here, in the case where the latent vector estimation unit 102 according to Modified Example 1 is implemented by the learned neural network, a loss function that involves not only the closeness (distances) between the latent vectors estimated by the neural network and the latent vectors $\sim u_{dn}$ and $\sim h_{dn}$ included in the learning data but also the MMD which is a distance between distributions is used as the loss function used for learning the parameters of the neural network. As a result, the "learned neural network" in which the parameters of the neural network have been updated can be obtained.

As described above, the analysis device 10 according to Modified Example 2 can estimate the latent vectors by the latent vector estimation unit 102 implemented by the learned neural network.

<Hardware Configuration of Analysis Device 10>

Figure 10:
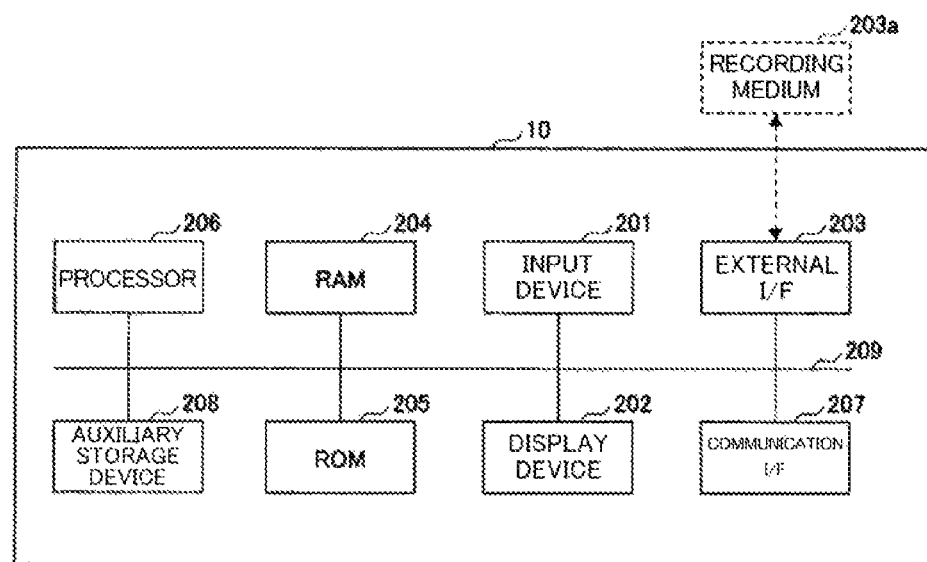
FIG. 10 is a diagram illustrating an example of a hardware configuration of the analysis device according to the embodiment of the present invention.

Finally, a hardware configuration of the analysis device 10 according to the embodiment of the present invention will be described with reference to FIG. 10. FIG. 10 is a diagram illustrating an example of the hardware configuration of the analysis device 10 according to the embodiment of the present invention.

As illustrated in FIG. 10, the analysis device 10 according to the embodiment of the present invention includes an input device 201, a display device 202, an external I/F 203, a RAM (Random Access Memory) 204, a ROM (Read Only Memory) 205, a processor 206, a communication I/F 207, and an auxiliary storage device 208. The respective pieces of hardware are communicatively connected via a bus 209.

The input device 201 is, for example, a keyboard, a mouse, and/or a touch panel, and is used by the user inputting various operations. The display device 202 is, for example, a display, and displays the processing results of the analysis device 10. Note that the analysis device 10 may not include at least one of the input device 201 and the display device 202.

The external I/F 203 is an interface with an external device. The external device includes a recording medium 203a and the like. The analysis device 10 can read and write the recording medium 203a and the like via the external I/F 203. In the recording medium 203a, one or more programs and the like may be recorded to implement the respective functional units (e.g., the input unit 101, the latent vector estimation unit 102, the transformation matrix estimation unit 103, the transformation unit 104, the matching unit 105, and the output unit 106) included in the analysis device 10.

Examples of the recording medium 203a include a flexible disk, a CD (Compact Disc), a DVD (Digital Versatile Disk), an SD memory card (Secure Digital memory card), a USB (Universal Serial Bus) memory card, and the like.

The RAM 204 is a volatile semiconductor memory that temporarily holds programs and data. The ROM 205 is a non-volatile semiconductor memory that can hold programs and data even when the power is turned off. The ROM 205 stores, for example, configuration information related to an OS (Operating System), configuration information related to a communication network, and the like.

The processor 206 is, for example, a CPU (Central Processing Unit), a GPU (Graphics Processing Unit), or the like, and is an arithmetic unit that reads programs and data from the ROM 205, the auxiliary storage device 208, and the like onto the RAM 204 to execute processing. Each functional unit included in the analysis device 10 is implemented by, for example, processing of causing the processor 206 to execute one or more programs stored in the auxiliary storage device 208. Note that the analysis device 10 may include both the CPU and the GPU as the processor 206, or may include only one of the CPU and the GPU.

The communication I/F 207 is an interface for connecting the analysis device 10 to the communication network. The one or more programs to implement the respective functional units of the analysis device 10 may be acquired (downloaded) from a predetermined server or the like via the communication I/F 207.

The auxiliary storage device 208 is, for example, an HDD (Hard Disk Drive), an SSD (Solid State Drive), or the like, and is a non-volatile storage device that stores programs and data. The programs and data stored in the auxiliary storage device 208 include, for example, an OS, an application program, and the one or more programs to implement the respective functional units of the analysis device 10.

The analysis device 10 according to the embodiment of the present invention has the hardware configuration illustrated in FIG. 10, and thus can perform the various processing described above. Note that although FIG. 10 illustrates an example of the hardware configuration when the analysis device 10 is implemented by one computer, the present invention is not limited to this, and the analysis device 10 may be implemented by a plurality of computers.

The present invention is not limited to the embodiments specifically disclosed above, and various modifications and changes can be made without departing from the scope of the claims.

REFERENCE SIGNS LIST

10 Analysis device
101 Input unit
102 Latent vector estimation unit
103 Transformation matrix estimation unit
104 Transformation unit
105 Matching unit
106 Output unit
111 Initialization unit
112 Gradient calculation unit
113 Latent vector update unit
114 Condition determination unit
121 Initialization unit
122 Gradient calculation unit
123 Transformation matrix update unit
124 Condition determination unit
131 Degree-of-association calculation unit
132 Matching determination unit

The invention claimed is:

1. An analysis device comprising:
a vector estimator configured to estimate, in response to receiving input of a plurality of pieces of relational data each including a plurality of objects and a relationship between the objects, for each piece of relational data, a latent vector for characterizing a structure of the relational data by using the objects and the relationship included in the relational data; and
a matcher configured to match, for each set of first relational data and second relational data different from each other of the received pieces of relational data, a first object and a second object by using a first latent vector corresponding to the first object included in the first relational data and a second latent vector corresponding to the second object included in the second relational data, wherein the vector estimator estimates, when the relationship indicates a close relationship between a plurality of objects to each other, latent vectors corresponding to the objects such that the latent vectors corresponding to the respective objects have a close relationship to each other.

2. The analysis device according to claim 1, comprising:
a transformation matrix estimator configured to estimate, for each piece of relational data, a transformation matrix for transforming the latent vector such that distributions of the latent vectors are close to each other between the received pieces of relational data; and
a transformer configured to transform, for each piece of relational data, a latent vector corresponding to an object included in the piece of relational data into a transformed latent vector by a transformation matrix corresponding to the piece of relational data, wherein the matcher matches, for each set of first relational data and second relational data different from each other of the received pieces of relational data, the first object and the second object by using a first transformed latent vector corresponding to the first object and a second transformed latent vector corresponding to the second object.

3. The analysis device according to claim 2, wherein the vector estimator estimates the latent vector by a neural network that has been learned in advance.

4. The analysis device according to claim 2, wherein the distributions of the latent vectors are closer to each other by reducing an maximum mean discrepancy (MMD) based on a distance between the distributions.

5. The analysis device according to claim 1, wherein the vector estimator estimates, when the relationship indicates a close relationship between a plurality of objects to each other, latent vectors corresponding to the objects such that the latent vectors corresponding to the respective objects have a close relationship to each other and distributions of the latent vectors are close to each other between the received pieces of relational data.

6. The analysis device according to claim 5, wherein the vector estimator estimates the latent vector by a neural network that has been learned in advance.

7. The analysis device according to claim 1, wherein the vector estimator estimates the latent vector by a neural network that has been learned in advance.

8. An analysis method executed by a computer, the method comprising:
   estimating, by a vector estimator, in response to receiving input of a plurality of pieces of relational data each including a plurality of objects and a relationship between the objects, for each piece of relational data, a latent vector for characterizing a structure of the relational data by using the objects and the relationship included in the relational data; and
   matching, by a matcher, for each set of first relational data and second relational data different from each other of the received pieces of relational data, a first object and a second object by using a first latent vector corresponding to the first object included in the first relational data and a second latent vector corresponding to the second object included in the second relational data, wherein the vector estimation step includes estimating, when the relationship indicates a close relationship between a plurality of objects to each other, latent vectors corresponding to the objects such that the latent vectors corresponding to the respective objects have a close relationship to each other.

9. The analysis method according to claim 8, the method further comprising:
   estimating, by a transformation matrix estimator, for each piece of relational data, a transformation matrix for transforming the latent vector such that distributions of the latent vectors are close to each other between the received pieces of relational data; and
   transforming, by a transformer, for each piece of relational data, a latent vector corresponding to an object included in the piece of relational data into a transformed latent vector by a transformation matrix corresponding to the piece of relational data, wherein the matcher matches, for each set of first relational data and second relational data different from each other of the received pieces of relational data, the first object and the second object by using a first transformed latent vector corresponding to the first object and a second transformed latent vector corresponding to the second object.

10. The analysis method according to claim 9, wherein the vector estimator estimates the latent vector by a neural network that has been learned in advance.

11. The analysis method according to claim 9, wherein the distributions of the latent vectors are closer to each other by reducing an maximum mean discrepancy (MMD) based on a distance between the distributions.

12. The analysis method according to claim 8, wherein the vector estimator estimates, when the relationship indicates a close relationship between a plurality of objects to each other, latent vectors corresponding to the objects such that the latent vectors corresponding to the respective objects have a close relationship to each other and distributions of the latent vectors are close to each other between the received pieces of relational data.

13. The analysis method according to claim 12, wherein the vector estimator estimates the latent vector by a neural network that has been learned in advance.

14. The analysis method according to claim 8, wherein the vector estimator estimates the latent vector by a neural network that has been learned in advance.

15. A system for analyzing, the system comprises:
   a processor; and
   a memory storing computer-executable program instructions that when executed by the processor cause the system to:
   estimate, by a vector estimator, in response to receiving input of a plurality of pieces of relational data each including a plurality of objects and a relationship between the objects, for each piece of relational data, a latent vector for characterizing a structure of the relational data by using the objects and the relationship included in the relational data; and
   match, by a matcher, for each set of first relational data and second relational data different from each other of the received pieces of relational data, a first object and a second object by using a first latent vector corresponding to the first object included in the first relational data and a second latent vector corresponding to the second object included in the second relational data, wherein the vector estimation step includes estimating, when the relationship indicates a close relationship between a plurality of objects to each other, latent vectors corresponding to the objects such that the latent vectors corresponding to the respective objects have a close relationship to each other.

16. The system for analyzing according to claim 15, the computer-executable program instructions when executed further causing the system to:
   estimate, by a transformation matrix estimator, for each piece of relational data, a transformation matrix for transforming the latent vector such that distributions of the latent vectors are close to each other between the received pieces of relational data; and
   transform, by a transformer, for each piece of relational data, a latent vector corresponding to an object included in the piece of relational data into a transformed latent vector by a transformation matrix corresponding to the piece of relational data, wherein the matcher matches, for each set of first relational data and second relational data different from each other of the received pieces of relational data, the first object and the second object by using a first transformed latent vector corresponding to the first object and a second transformed latent vector corresponding to the second object.

17. The system for analyzing according to claim 16, wherein the vector estimator estimates the latent vector by a neural network that has been learned in advance.

18. The system for analyzing according to claim 15, wherein the vector estimator_estimates, when the relationship indicates a close relationship between a plurality of objects to each other, latent vectors corresponding to the objects such that the latent vectors corresponding to the respective objects have a close relationship to each other and distributions of the latent vectors are close to each other between the received pieces of relational data.

19. The system for analyzing according to claim 18, wherein the vector estimator estimates the latent vector by a neural network that has been learned in advance.

20. The system for analyzing according to claim 15, wherein the vector estimator estimates the latent vector by a neural network that has been learned in advance.

* * * * *